Feb. 21, 1967 H. PASTERNACK 3,304,819
APPARATUS FOR SEVERING PLASTIC PIPES AND THE LIKE
Filed Feb. 2, 1965 3 Sheets-Sheet 2

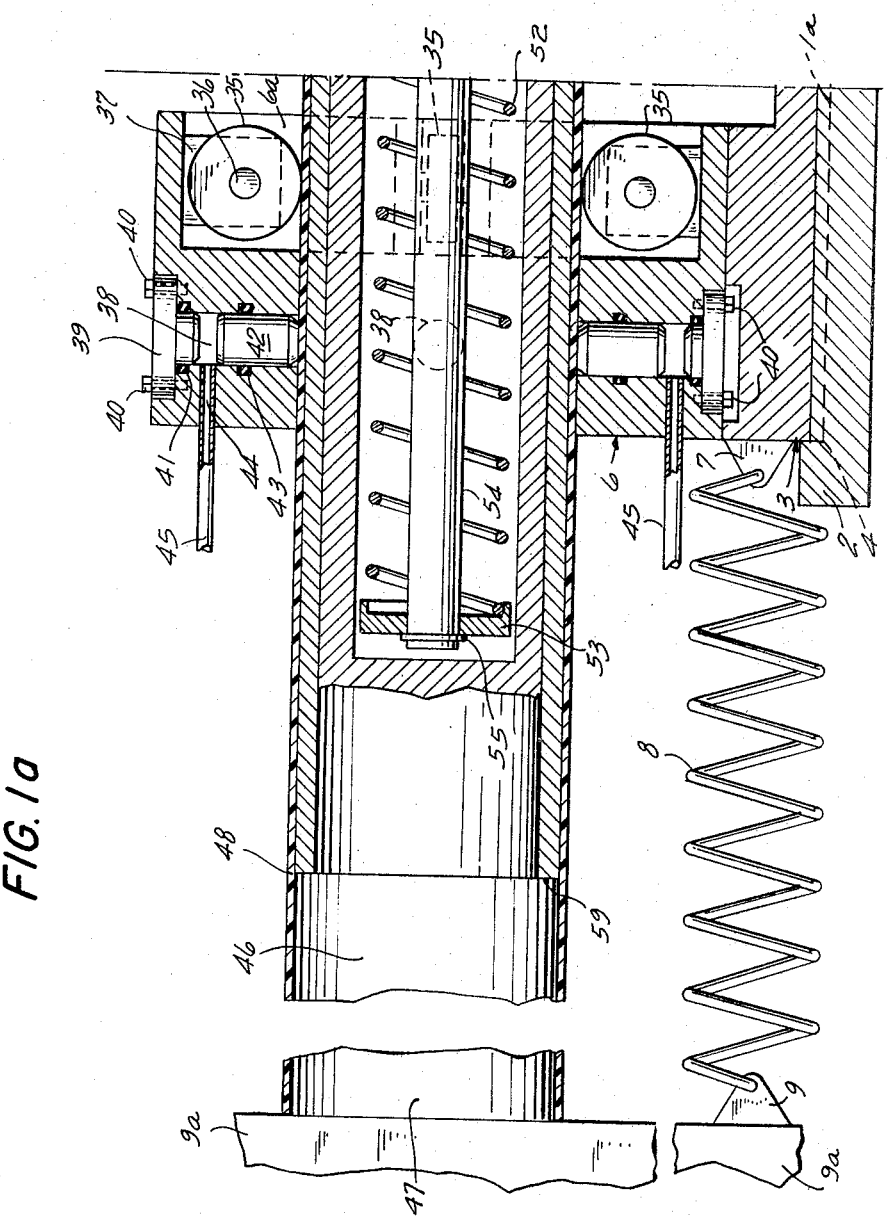

INVENTOR
HORST PASTERNACK
BY
*Michael J. Striker*
his ATTORNEY

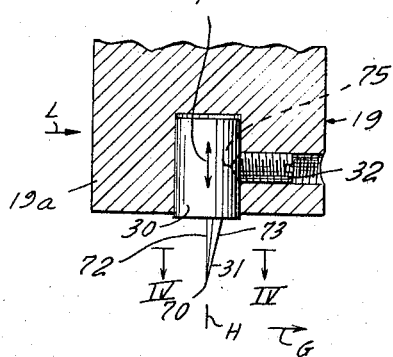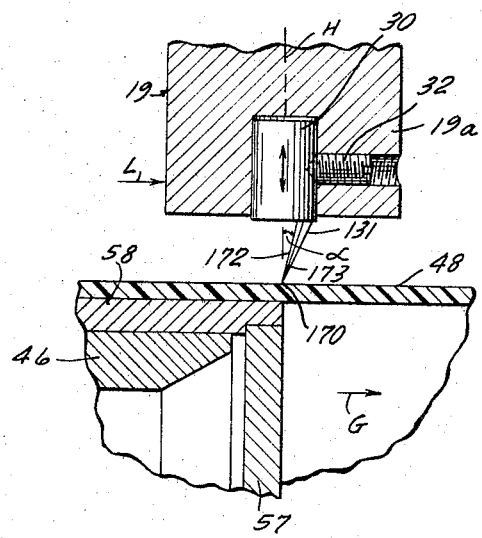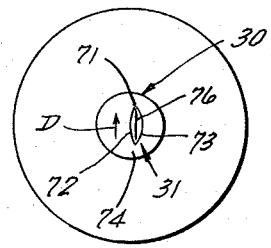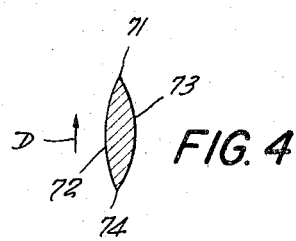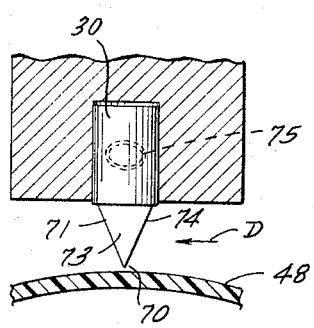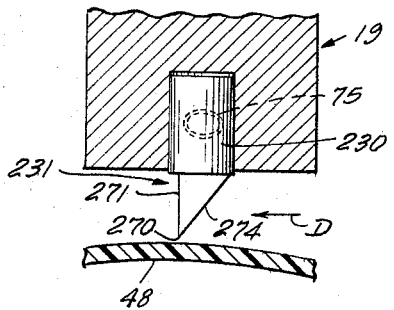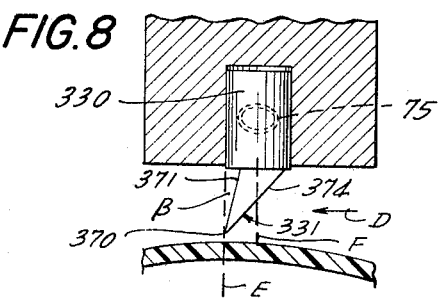

United States Patent Office 3,304,819
Patented Feb. 21, 1967

3,304,819
APPARATUS FOR SEVERING PLASTIC PIPES AND THE LIKE
Horst Pasternack, Essen, Germany, assignor to Wasag-Chemie Aktiengesellschaft, Essen, Germany
Filed Feb. 2, 1965, Ser. No. 429,792
Claims priority, application Germany, Feb. 7, 1964, W 36,185
25 Claims. (Cl. 82—53.1)

The present invention relates to an apparatus for severing pipes, bands, films, foils, sheets and other types of elongated workpieces consisting of wood fiber, synthetic plastic material or other substances. More particularly, the invention relates to an apparatus for subdividing an elongated workpiece which travels lengthwise into sections of predetermined length.

Heretofore known apparatus which are utilized for subdividing a travelling tubular workpiece at selected intervals to form sections of desired length invariably produce at least some shavings. It also happens that the end faces of the sections are formed with fins, webs, burrs and similar byproducts of the severing operation which must be removed by subjecting the sections to one or more costly additional treatments. Furthermore, conventional severing apparatus normally produce dust particles which are charged with static electricity and cling to the sections. The operation to remove such dust particles is costly and time consuming.

Accordingly, it is an important object of the present invention to provide a novel apparatus which is constructed and assembled in such a way that it can sever plastic pipes and similar profiled workpieces without any or with a negligible amount of shavings, which can sever such workpieces without creating any dust, and which can form an exceptionally clean cut despite the fact that the workpiece travels lengthwise while the cutting operation takes place.

Another object of the invention is to provide an apparatus which can be converted for severing of differently dimensioned and/or profiled workpieces, which can be adjusted to sever a continuous workpiece into sections of requisite length, whose operation is fully automatic, and which can be employed for severing of comparatively hard or soft and readily deformable materials.

A further object of the invention is to provide an apparatus which can be arranged to form two or more cuts in a simultaneous operation so that a travelling workpiece may be rapidly subdivided into sections of identical or different length.

Another object of the invention is to provide a novel cutter which may be utilized in an apparatus of the above outlined characteristics and to provide a novel mounting for the cutter so that the latter may be adjusted, exchanged or otherwise manipulated in order to insure the formation of a cut without producing shavings, dust, irregular surfaces or other defects.

An additional object of the invention is to provide a cutter which can withstand vibratory and other types of stresses normally arising when an elongated plastic tube or another profiled workpiece is severed while travelling lengthwise from the point of manufacture to a further processing station.

A concomitant object of the invention is to provide a novel control system which insures that the cutter invariably subdivides the travelling workpiece into sections of desired length and that the cutter automatically returns to its starting position following each cutting operation.

Briefly stated, one feature of my invention resides in the provision of an apparatus for severing plastic pipes and similar elongated workpieces into sections of predetermined length while such workpieces travel lengthwise. In its simplest form, the apparatus comprises an elongated guide in the form of a fixed mandrel or the like which is inserted into the workpiece so that the workpiece travels in the axial direction of the mandrel, a back support which may take the form of a cylinder axially reciprocably mounted on the mandrel and telescoped into the travelling workpiece, annular bearing means surrounding at least a portion of the back support and movable in the axial direction of the mandrel, coupling means mounted on the bearing means and operative to engage and to clamp the workpiece against the back support so that the back support and the bearing means are then compelled to travel with and at the speed of the workpiece, and cutter means mounted on the bearing means and operative to sever the workpiece while the workpiece is clamped between the coupling means and the back support to insure that the severing action takes place while the cutter means advances with and at the exact speed of the workpiece.

If the workpiece is a tube, the apparatus further comprises means for rotating the cutter means around the axis of the mandrel in order to form a cut which is located in a plane intersecting at right angles the axis of the workpiece. The apparatus may also comprise a carriage for the bearing means, fixed guideways for the carriage, means for returning the bearing means and the carriage to a starting position following the completion of a cut, and means for returning the cylinder to a starting position in response to disengagement of the coupling means.

The bearing means may carry two or more cutter means and such cutter means may form cuts in a simultaneous operation or seriatim. A control system is provided to actuate the coupling means and the cutter means in a predetermined sequence to make sure that the workpiece is subdivided into sections of desired length.

The novel features which are considered as characteristic of the invention are set forth in particular in the appended claims. The improved severing apparatus itself, however, both as to its construction and its mode of operation, together with additional features and advantages thereof, will be best understood upon perusal of the following detailed description of certain specific embodiments with reference to the accompanying drawings, in which:

FIG. 2 is an enlarged fragmentary detail view of the apparatus and shows the cutter means together with the mounting means therefor;

FIG. 3 is an end elevational view of the cutter means as seen from the underside of FIG. 2;

FIG. 4 is a section through the cutter means as seen in the direction of arrows from the line IV—IV of FIG. 2;

FIG. 5 is a vertical section taken in the plane H of FIG. 2 as seen in the direction of arrow L;

FIG. 6 illustrates a portion of the apparatus shown in FIG. 1 with a second type of cutter means;

FIG. 7 is a fragmentary transverse vertical section through the apparatus and illustrates a third type of cutter means; and FIG. 8 is a similar fragmentary section and illustrates a fourth type of cutter means.

Figure 1B:
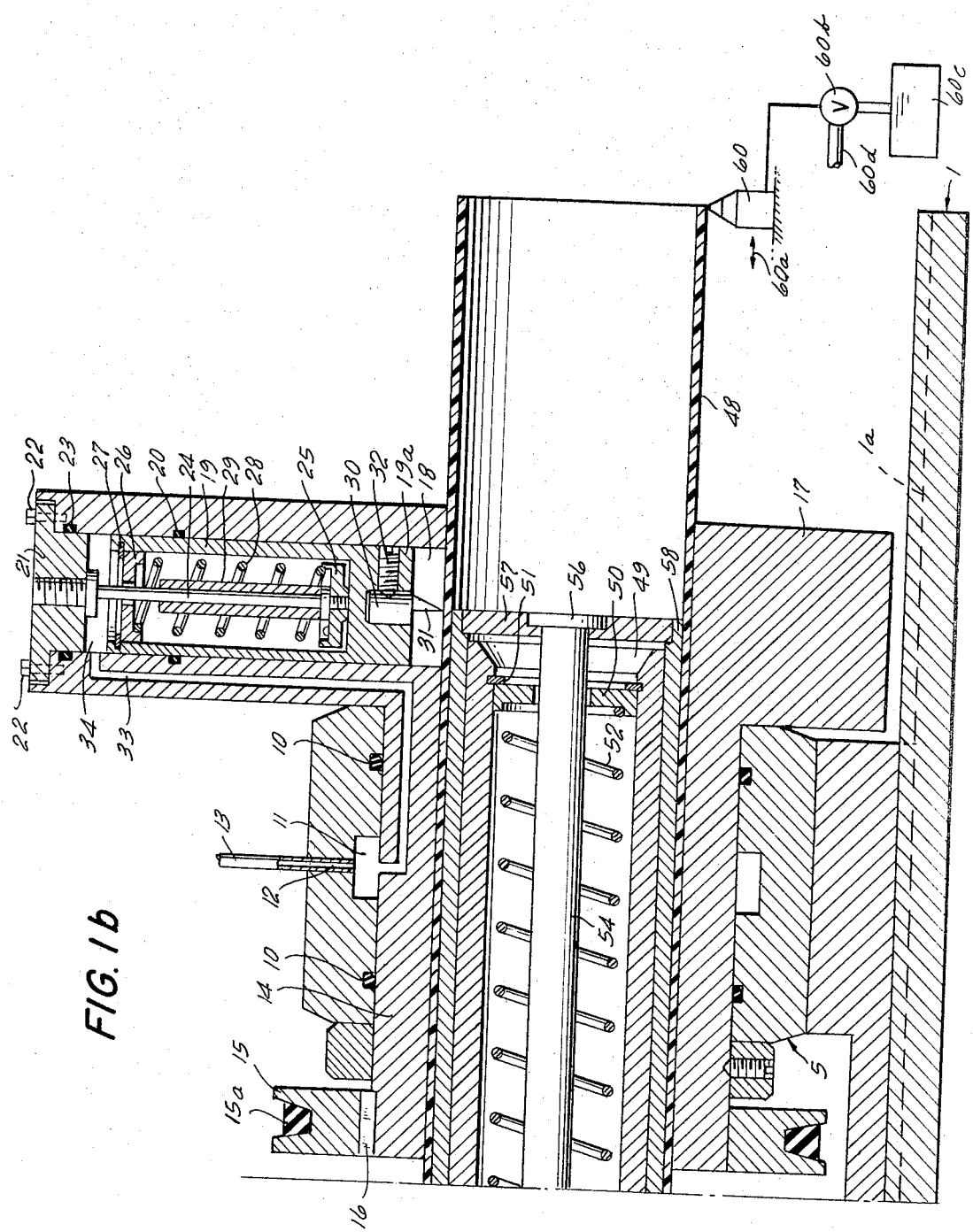
FIG. 1 is an axial section through an apparatus which embodies my invention, the parts of the apparatus being shown in positions they assume when the cutter means has completed a severing operation and was caused to return to its starting position.

Referring to FIG. 1, there is shown a cutting or severing apparatus which comprises a base plate 1 serving as a main supporting means and provided at its upper side with a pair of spaced elongated guideways 1a to receive dovetailed rails 4 of a reciprocable carriage or slide 3 arranged therebetween. Movements of this carriage in one direction (i.e., in a direction to the left, as the parts appear in FIG. 1), are limited by a stop 2 which is rigid with the base plate 1 and serves to arrest the carriage in its starting position.

The carriage 3 supports and is connected with two bearing units 5, 6 and this carriage is also provided with a projection or lug 7 which is attached to one end of a helical return spring 8. The other end of the return spring 8 is secured to a projection or lug 9 provided on a stationary frame member 9a. This frame member 9a may be rigid with the base plate 1.

The bearing unit 5 is of the radial type and accommodates two annular sealing gaskets 10 of identical diameter. These gaskets are inserted into annular grooves machined in the internal surface of the bearing unit 5. Intermediate the gaskets 10, the bearing unit 5 is provided with an internal annular groove 11 which communicates with a radially outwardly extending bore 12 connected to a supply conduit 13 for oil or another pressure fluid. The axial bore of the bearing unit 5 accommodates a hollow cylindrical hub 14 forming part of a drive which further includes a driver pulley 15 and an endless V belt 15a. The pulley 15 is non-rotatably secured to the left-hand end portion of the hub 14 by a key 16. The right-hand end portion of the hub 14 is integral with an annular disk-shaped carrier or flange 17 which is formed with a large-diameter radial bore 18. The bore 18 accommodates a reciprocable hollow piston 19 whose skirt is surrounded by an annular sealing gasket 20, the latter being recessed into the surface which surrounds the bore 18. The outer end of the bore 18 is closed by a cover or plug 21 which is detachably affixed to the flange 17 by a series of bolts or screws 22. The inner end portion of the plug 21 is surrounded by an annular sealing gasket 23 which is recessed into the flange 17. The plug 21 is threadedly connected with the outer end portion of a shaft 24 which extends into the space defined by the skirt of the piston 19. The inner end portion of the shaft 24, is screwed into an annular spring retainer 25. A second spring retainer 26 is inserted into the open outer end of the piston 19 and is held against outward axial movement by a split ring 27. A prestressed expansion spring 28, here shown as a helical spring, is accommodated in the skirt of the piston 19 and bears against the retainers 25, 26. The median portion of the shaft 24 is surrounded by a spacer sleeve 29 which determines the stroke of the piston 19 in a direction toward the axis of the flange 17. When the piston 19 reaches the end of its working (inward) stroke, the outer end of the sleeve 29 abuts against the spring retainer 26.

The inner end portion or bottom wall 19a of the piston 19 is provided with an axially extending bore which accommodates a cylindrical pin-shaped holder or shaft 30. This holder is held against axial movement by a radial retaining screw 32 and its inner end portion carries or is integral with a cutter 31. The cutter 31 is provided with a cutting edge and resembles a knife.

The cylinder chamber 34 between the outer end portion of the piston 19 and the plug 21 communicates with a channel 33 which is machined into the flange 17 and communicates with the internal groove 11 of the bearing unit 5. Since the groove 11 is of annular shape, the channel 33 will remain in communication therewith regardless of the angular position of the hub 14 and flange 17.

The other bearing unit 6 is provided with four equidistant cutouts 6a which extend inwardly from its right-hand end face and accommodate guide rollers 35. The rollers 35 are rotatable on shafts 36 which are equidistant from the axis of the bearing unit 6 and are mounted in bearing brackets 37. The bearing unit 6 is further provided with at least four equidistant radially extending bores or chambers 38 and the outer end of each bore 38 is sealed by a lid 39 affixed to the body of the bearing unit 6 by screws or bolts 40. The lids 39 are readily detachable from the bearing unit 6. The inner end portions of the lids 39 are surrounded by annular sealing gaskets 41 which prevent leakage of hydraulic fluid through the outer ends of the bores 38. Each of these bores accommodates a reciprocable coupling plunger 42, and each of these plungers is surrounded by an annular sealing gasket 43 which is recessed into the material of the bearing unit 6. That portion of each bore 38 which extends between the corresponding lid 39 and the associated coupling plunger 42 forms a cylinder chamber which is connected with an axially extending bore 44 of the bearing unit 6. The bores 44 terminate at the left-hand end face of the unit 6 and are connected with supply conduits 45.

The bearing units 5, 6 are coaxial with an elongated cylindrical guide or mandrel 46 whose larger-diameter left-hand end portion 47 is secured to the fixed frame member 9a or to another stationary part of the apparatus. The mandrel 46 serves to determine the shape of the workpiece 48 to be severed by the cutter 31. In the illustrated embodiment, the workpiece 48 is a pipe which consists of synthetic thermoplastic material, and the leading end of this pipe is nearer to the unit 5 than to the unit 6.

The mandrel 46 is formed with a blind bore 49 which extends inwardly from the right-hand end face thereof and accommodates an annular spring retainer 50. The retainer 50 is held against outward axial movement by a split ring 51 and cooperates with a second retainer 53 to confine a helical expansion spring 52. The retainer 53 is mounted at the inner end of an elongated spindle 54 and is fixed against axial movement in a direction to the left, as viewed in FIG. 1, by a split ring 55. The right-hand end portion of the spindle 54 carries a stop collar 56 which is recessed into a washer-like cap 57. The marginal portion of the cap 57 is recessed into the right-hand end face of an elongated back support here shown as a cylinder 58 whose left-hand end face abuts against an annular shoulder 59 of the mandrel 46. The numeral 60 denotes a signal generating device here shown as a limit switch whose purpose will be presently described. This limit switch is located in the path of and is operated by the workpiece 48 to effect the operation of the cutter 31 with a certain delay following the operation of coupling plungers 42.

The apparatus of FIG. 1 is operated as follows:

The V belt 15a is driven by an electric motor or by another suitable prime mover which is mounted on the carriage 3 and rotates the pulley 15 so that the pulley drives the hub 14 and flange 17. The pipe 48 is formed on the mandrel 46 in a manner known per se and travels forwardly, i.e., in a direction to the right, as the parts appear in FIG. 1. The pipe 48 travels over the back support constituted by the cylinder 58 and reaches the guide rollers 35 which serve to center the mandrel 46. Ultimately, the pipe 48 advances beyond the right-hand end of the cylinder 58 and moves on toward the limit switch 60. The position of the limit switch 60 is adjustable so that this switch may be fixed at any desired distance from the cutter 31. This is indicated by a double-headed arrow 60a. The switch 60 forms part of a control device and serves to open a suitable regulating valve 60b which admits pressure fluid from a source 60c so that such fluid flows into the supply conduits 13 and 45. The numeral 60d denotes a connecting conduit which delivers pressure fluid to the conduits 13, 45. The arrangement is such that the chamber 34 receives pressure fluid with a certain delay, i.e., the coupling plungers 42 are caused to move radially inwardly and to engage the periphery of the pipe 48 before the piston 19 is caused to perform a working stroke in a direction toward the axis of the cylinder 58. When the bores 38 of the bearing unit 6 receive pressure fluid from the source 60c, the tips of the plungers 42 bear against the pipe 48 and clamp this pipe against the periphery of the cylinder 58. Since the pipe 48 continues to travel lengthwise in a direction toward the limit switch 60, it entrains the cylinder 58 which slides on the reduced-diameter right-hand portion of the mandrel 46 and compels the spindle 54 to share such axial movement in a direction to the right to thereby compress the spring 52 because the retainer 53 moves with the spindle but the retainer 50 remains stationary. The speed of the cylinder 58 then corresponds to the axial speed of the pipe 48. Since the bearing unit 6 is rigidly affixed to the carriage 3, the latter moves in the ways 1a against the bias of the spring 8 and entrains the bearing unit 5, together with the hub 14 and flange 17. The delay in admission of pressure fluid into the chamber 34 of the flange 17 is selected in such a way that the piston 19 begins to move radially inwardly at the time the carriage 3 begins to slide in the guideways 1a of the base plate 1. Therefore, the edge of the orbiting cutter 31 engages the material of the pipe 48 while the flange 17 moves at the same speed as the pipe. The operative connection between the limit switch 60 and valve 60b synchronizes the radially inward movement of the cutter 31 with the axial movement of the hub 14 and flange 17 in such a way that the cutter severs a predetermined length of the pipe 48. The inward stroke of the piston 19 is limited by the spacer sleeve 29 which then abuts against the outer spring retainer 26.

As soon as the cutter 31 completes a severing operation, the valve 60b allows pressure fluid to escape from the chamber 34 and from the bores 38 whereby the spring 28 expands and moves the cutter 31 radially outwardly. The coupling plungers 42 move away from the pipe 48 so that the spring 52 is free to expand and returns the cylinder 58 to the starting position of FIG. 1. Also, the carriage 3 is now free to follow the bias of the spring 8 and returns into its starting position of abutment with the stop 2.

It is clear that the apparatus of the present invention may be modified to sever pipes of polygonal cross section and/or to sever bands or foils of any desired width. Furthermore, the flange 17 may be connected with one or more similar flanges which are spaced at desired intervals so that the apparatus will sever the pipe 48 in two or more planes in a simultaneous operation. The arrangement is preferably such that the distance between the adjoining flanges 17 may be adjusted at the will of the operators to rapidly convert the apparatus for the production of pipe sections of any desired length. Though the limit switch 60 is then preferably placed ahead of the foremost flange 17, it may remain in the illustrated position if the control system including the valve 60b is provided with a suitable delay device which admits pressure fluid at desired intervals.

If the apparatus is used to sever bands or foils, the back support consists of a slidable table and the cutter is arranged to move with the table and to simultaneously reciprocate in a direction at right angles to the longitudinal direction of the workpiece. The table is mounted on a suitable guide corresponding to the mandrel 46 and returns to its starting position whenever the cutter completes a severing operation.

Referring to FIGS. 2 to 5, the piston 19 is reciprocable in directions indicated by a double-headed arrow P. As explained hereinabove, this piston performs a working stroke in response to admission of pressure fluid into the chamber 34 of the flange 17, and the spring 28 takes care of the return stroke by moving the spacer sleeve 29 in abutment with the outer spring retainer 26. The arrow G indicates the direction of lengthwise movement of the pipe 48, and the piston 19 shares such movement (see the arrow L) by simultaneously orbiting about the axis of the pipe 48 because the flange 17 is driven by the belt 15a and pulley 15.

The tip of the cutter 31 is indicated at 70, and this cutter has two side faces 72, 73 which surround a cutter portion of substantially elliptical outline, see FIG. 4. When viewed in the direction indicated by the arrow G or L, the cutter 31 resembles an isosceles or equilateral triangle, see particularly FIG. 5. The cutting edge 71 is sharpened, and it will be noted that this cutting edge is leading when the cutter 31 orbits in the direction indicated by the arrow D.

The rear edge of the cutter is indicated at 74.

The mounting of the cutter 31 in its holder 30 is such that the rear side face 72 is located in a radial plane H which is substantially normal to the axis of the pipe 48. The other (front) side face 73 is inclined forwardly with reference to the plane H as seen in the direction of travel of the workpiece 48 so that the general planes of the side faces 72, 73 define between themselves a small acute angle best shown in FIG. 2. The inclination of the front side face 73 is such that the tip 70 is located behind the innermost point of this side face, as seen in the direction in which the pipe 48 advances through the apparatus (arrow G).

FIG. 6 illustrates a somewhat modified cutter 131 whose plane is inclined with reference to the plane of the cutter 31 of FIGS. 1a to 3. Thus, the side rear face 172 of the cutter 131 is located in a plane which is not normal to the axis of the pipe 48. In other words, the faces 172, 173 are inclined forwardly with reference to the radial plane H as seen in the direction of the arrow G. The angle alpha between the radial plane H and the plane of the rear side face 172 is an acute angle. It can be said that the angle alpha approximates the angle between the front side face 73 on the cutter 31 and the radial plane H. Consequently, the forward inclination of the front side face 173 with reference to the radial plane H exceeds the inclination of the front side face 73.

FIG. 7 shows a cutter 231 whose cutting edge 271 extends substantially radially with reference to the workpiece 48, i.e., this cutting edge is parallel with the axis of the piston 19. The rear edge 274 is the longest side of a right-angled triangle whose shortest side is adjacent to the holder 230.

In FIG. 8, the cutting edge 371 makes an acute angle beta with a plane E which is parallel to the axial plane F of the workpiece 48. The cutting edge 371 is inclined rearwardly as seen in the direction in which the cutter 331 orbits about the cylinder 58 (arrow D). In this embodiment, the tip 370 of the cutter 331 is located forwardly of the plane F. The cutter 331 is integral with the holder 330 and its rear edge is shown at 374. The profile of the cutter 331 resembles an obtuse-angled triangle.

It will be seen that the profile of the cutter may resemble an isosceles or equilateral triangle (FIGS. 2–5) whose tip is located in a plane passing through the axis of the workpiece 48, that the cutter may be located in a plane which is substantially normal to the axis of the workpiece (FIGS. 2–5), that the cutter may be located in a plane which makes an acute angle alpha with a radial plane of the workpiece (FIG. 6), that the cutting edge may extend radially of the workpiece (FIG. 7), that the cutting edge may be inclined forwardly with reference to the tip (FIGS. 2–5), or that the cutting edge may be inclined rearwardly of the tip (FIG. 8). Also, and as best shown in FIGS. 2, 3 and 6, the cutter may be eccentric with reference to the holder. The holder is preferably rotatable in the end portion 19a of the piston 19 and is provided with an elliptical or elongated slot-shaped cutout 75 whose longer axis extends in the circumferential direction of the holder (see FIGS. 5 and 7) which may receive the tip of the retaining screw 32. This enables the operator to change the angular position of the central cutter plane 76 which passes through the edges 71, 74 (see FIG. 3). The angle between the plane 76 and the radial plane of the workpiece 48 may be a positive angle or a negative angle. In FIG. 2, the plane 76 is located substantially in a radial plane of the workpiece. The position of the edges 71, 74 may be interchanged if the operator decides to change the direction in which the pulley 15 rotates. By changing the inclination of the plane 76 with reference to a radial plane of the workpiece 48, the operator may move the cutting edge 71 ahead of or behind the rear edge 74 as seen in the direction in which the workpiece moves lengthwise (arrow G).

The exact configuration, inclination and mounting of the cutter with reference to the workpiece is of great importance to insure that the workpiece will be severed without any shavings and without rough edges along the cutting plane. Since the workpiece moves lengthwise, even small differences between the forward speed of the cylinder 58 and flange 17 would cause vibration of the cutter in and counter to the direction indicated by the arrow G or L while the cutter penetrates into the material of the workpiece. As the tip of the cutter penetrates into the workpiece 48, it meets an increasing resistance to such penetration and the material of the workpiece tends to flex the cutter in a direction counter to that indicated by the arrow D. Such flexing of the cutter is avoided without fail if the cutting edge 271 or 371 is inclined in a manner as shown in FIGS. 7 and 8. The thinner the cutter, the more likely it is to form a cut without shavings while it severs a thin-walled and readily deformable plastic pipe or the like. The cutting edge of the cutter may be sharpened at regular intervals or during each revolution of the flange 17, for example, in a manner known from the cutting devices for tobacco rods in cigarette machines.

If the tip 70 or 170 is positioned in a manner as shown in FIGS. 2 and 6, i.e., in such a way that the tip is located at the inner (rear) end of a forwardly inclined front side face 73 or 173, as seen in the direction of the arrow G in which the workpiece 48 moves lengthwise, the cutter is capable of taking up many axial stresses without affecting the quality of the cut because the cutter will not vibrate in response to such axial stresses.

In summation, it can be said that the cutter will be held against vibration in and counter to the direction indicated by the arrow G if the front side face 73 or 173 is inclined in such a way that the tip 70 or 170 is located at the rearmost end of this front side face. On the other hand, vibrations in and counter to the direction indicated by the arrow D are prevented most effectively if the tip 270 or 370 is positioned in a manner as shown in FIGS. 7 or 8 wherein the tip is at that end of the cutting edge 271 or 371 which is the foremost end of the cutter. Vibrations of the cutter in the axial direction of the workpiece 48 are likely to occur if the forward speed of the workpiece differentiates from the forward speed of the flange 17 and piston 19, and vibrations in the circumferential direction of the workpiece might take place in response to changes in rotational speed of the flange 17 and piston 19 about the axis of the workpiece. A construction embodying the features of the cutters 131 and 331 is most likely to prevent such vibrations.

The adjustability of the cutter about the axis of its holder (cutout 75) is of advantage when the workpiece 48 consists of readily deformable material whose hardness is not uniform in all zones thereof.

A suitable apparatus for producing pipes of plastic material as being severed by the apparatus of this invention is described for instance in "Die Kunststoffe," 1959, pp. 322–23, by G. Schulz, Munich, Carl Hanser Verlag.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An apparatus for severing plastic pipes and other types of elongated workpieces into sections of predetermined length while such workpieces travel lengthwise, comprising elongated guide means; a back support mounted on said guide means for movement with the workpiece; bearing means surrounding at least a portion of said back support; coupling means mounted on said bearing means and operative to clamp the workpiece against said back support so that the back support and said bearing means travel with and at the speed of the workpiece in response to operation of said coupling means; and cutter means mounted on said bearing means and operative to sever the workpiece while the workpiece is clamped.

2. An apparatus for severing plastic pipes and other types of elongated workpieces while such workpieces travel lengthwise; comprising elongated guide means; a back support mounted on said guide means for movement with the workpiece; annular bearing means surrounding at least a portion of said back support; main supporting means defining fixed guideways parallel with said guide means; a carriage connected with said bearing means and mounted in said guideways for movement to and from a starting position; means for biasing said carriage to said starting position; coupling means mounted on said bearing means and operative to clamp the workpiece against said back support so that, when said coupling means engages the workpiece, said back support, said bearing means and said carriage travel as a unit with and at the speed of the workpiece in a direction away from said starting position; and cutter means mounted on said bearing means and operative to sever the workpiece while the workpiece is clamped.

3. An apparatus for severing plastic pipes and other types of elongated workpieces while such workpieces travel lengthwise; comprising elongated guide means; a back support mounted on said guide means for movement with the workpiece; annular bearing means surrounding at least a portion of said back support; main supporting means defining fixed guideways parallel with said guide means; a carriage connected with said bearing means and mounted in said guideways for movement to and from a starting position; means for biasing said carriage to said starting position; coupling means mounted on said bearing means and operative to clamp the workpiece against said back support so that, when said coupling means engages the workpiece, said back support, said bearing means and said carriage travel as a unit with and at the speed of the workpiece in a direction away from said starting position; cutter means mounted on said bearing means and operative to sever the workpiece while the workpiece is clamped; and control means for operating said coupling means and said cutter means at such intervals that the cutter means severs the workpiece into sections of predetermined length and said coupling means is disengaged from the workpiece following each severing operation whereby said carriage is free to return to said starting position.

4. An apparatus for severing plastic pipes and other types of elongated workpieces while such workpieces travel lengthwise, comprising a fixed mandrel; a tubular back support slidably mounted on said mandrel and arranged to be telescoped into the workpiece; annular bearing means surrounding at least a portion of said back support; main supporting means; a carriage connected with said bearing means and mounted on said supporting means for movement to and from a starting position counter to and in the direction of travel of the workpiece; means for biasing said carriage to said starting position; coupling means mounted on said bearing means and operative to clamp the workpiece against said back support so that said back support, said bearing means and said carriage travel as a unit with and at the speed of the workpiece in a direction away from said starting position when said coupling means is in operation; cutter means mounted on said bearing means and arranged to orbit about said back support, said cutter means being operative to sever the workpiece while the workpiece is clamped; drive means for orbiting said cutter means; and control means for operating said coupling means and said cutter means at such intervals that the workpiece is subdivided into sections of predetermined length and said coupling means is disengaged from the workpiece following each severing operation whereby the carriage automatically returns to said starting position.

5. An apparatus as set forth in claim 4, further comprising means for returning said back support to a starting position in response to disengagement of said coupling means.

6. An apparatus for severing plastic pipes and other types of elongated workpieces while such workpieces travel lengthwise, comprising a fixed mandrel; a tubular back support slidably mounted on said mandrel and arranged to be telescoped into a travelling workpiece; annular bearing means surrounding at least a portion of said back support; means for biasing said back support and said bearing means to a starting position in a direction counter to the travel of the workpiece; coupling means mounted on said bearing means and operative to clamp the workpiece to said back support so that said back support and said bearing means travel as a unit with and at the speed of the workpiece when said coupling means is in operation; cutter means mounted on said bearing means for orbital movement about said back support and operative to sever the workpiece in response to operation of said coupling means; drive means for orbiting said cutter means; and control means for operating said cutter means and said coupling means at predetermined intervals so that the workpiece is subdivided into sections of desired length and for disengaging said coupling means and said cutter means from the workpiece subsequent to severing of the workpiece whereby said back support and said bearing means automatically return to said starting position.

7. An apparatus as set forth in claim 6, wherein said coupling means comprises a plurality of plungers movable radially of said back support in chambers provided in said bearing means, said control means comprising a source of compressed fluid, conduit means connecting said source with said chambers, and valve means for intermittently admitting fluid to said chambers in a direction to move said plungers radially inwardly and into clamping engagement with the workpiece.

8. An apparatus as set forth in claim 7, wherein said drive means comprises a carrier rotatably mounted on said bearing means and a piston supportingly connected with said cutter means and reciprocably received in a radial chamber provided in said carrier, said control means further comprising conduit means connecting said source with said last named chamber and said valve means being operative to admit fluid into said last named chamber so as to move said piston radially inwardly whereby said cutter means penetrates into the material of the workpiece.

9. An apparatus as set forth in claim 8, wherein said control means further comprises an impulse generating device located in the path of and operated by the workpiece to actuate said valve means.

10. An apparatus for severing plastic pipes and other types of elongated workpieces while such workpieces travel lengthwise, comprising a fixed mandrel; a tubular back support slidably mounted on said mandrel and arranged to be telescoped into a travelling workpiece; annular bearing means surrounding at least a portion of said back support; means for biasing said back support and said bearing means to a starting position in a direction counter to the travel of the workpiece; coupling means mounted on said bearing means and operative to clamp the workpiece to said back support so that said back support and said bearing means travel as a unit with and at the speed of the workpiece when said coupling means is in operation; cutter means mounted on said bearing means for orbital movement about said back support and operative to sever the workpiece in response to operation of said coupling means, said cutter means comprising a cutter of substantially triangular profile; drive means for orbiting said cutter means; and control means for operating said cutter means and said coupling means at predetermined intervals so that the workpiece is subdivided into sections of desired length and for disengaging said coupling means and said cutter means from the workpiece subsequent to severing of the workpiece whereby said back support and said bearing means automatically return to said starting position.

11. An apparatus as set forth in claim 10, wherein the profile of said cutter resembles an equilateral triangle.

12. An apparatus as set forth in claim 10, wherein the profile of said cutter resembles a right-angled triangle.

13. An apparatus as set forth in claim 10, wherein the profile of said cutter resembles an obtuse-angled triangle.

14. An apparatus as set forth in claim 10, wherein said cutter comprises a cutting edge which extends substantially radially with reference to said back support.

15. An apparatus as set forth in claim 10, wherein said cutter comprises a cutting edge which is forwardly inclined with reference to an axial plane of said back support as seen in the direction of orbital movement of said cutter means.

16. An apparatus as set forth in claim 10, wherein said cutter comprises a cutting edge which is rearwardly inclined with reference to an axial plane of said back support as seen in the direction of orbital movement of said cutter means.

17. An apparatus as set forth in claim 10, wherein said cutter means its movable angularly about an axis which extends radially of said back support and further comprising means for retaining the cutter means in selected angular positions.

18. An apparatus as set forth in claim 10, wherein said cutter means comprises a holder having an axis extending radially of said back support and wherein said cutter is eccentric with reference to said holder.

19. An apparatus as set forth in claim 10, wherein said cutter comprises a rear side face which is located in a radial plane of said back support.

20. An apparatus as set forth in claim 10, wherein said cutter comprises front and rear side faces both of which are inclined forwardly with reference to a radial plane of said back support as seen in the direction of travel of the workpiece.

21. An apparatus for severing plastic pipes and other types of elongated workpieces while such workpieces travel lengthwise, comprising a fixed mandrel; a tubular back support slidably mounted on said mandrel and arranged to be telescoped into a travelling workpiece; a pair of annular bearing units surrounding axially spaced portions of said back support, one of said bearing units being nearer to the leading end of the workpiece; a carriage rigid with said bearing units; means for biasing said carriage and said back support to a starting position in a direction counter to the travel of the workpiece; coupling means mounted on the other bearing unit and operative to clamp the workpiece to said back support so that said carriage and said back support travel as a unit with and at the speed of the workpiece when said coupling means is in operation; cutter means mounted on said one bearing unit for orbital movement about said back support and operative to sever the workpiece in response to operation of said coupling means so that the workpiece is severed while clamped to said back support and while travelling at the speed of said cutter means; drive means for orbiting said cutter means; and control means for operating said cutter means and said coupling means at predetermined intervals so that the workpiece is subdivided into sections of desired length and for disengaging said cutter means and said coupling means subsequent to severing of the workpiece whereby said carriage and said back support automatically return to said starting position.

22. An apparatus as set forth in claim 21, wherein said control means comprises a limit switch located in the path of the workpiece forwardly of said one bearing unit and arranged to effect operation of said cutter means with a predetermined delay following the operation of said coupling means.

23. An apparatus for severing plastic pipes and other types of elongated workpieces into sections of predetermined length while such workpieces travel lengthwise, comprising elongated guide means; a back support mounted on said guide means for temporary travel with the workpiece; bearing means arranged to travel temporarily with the workpiece; coupling means mounted on said bearing means and operative to clamp the workpiece against said back support so that the back support and said bearing means travel with and at the speed of the workpiece in response to operation of said coupling means; and cutter means mounted on said bearing means and operative to sever the workpiece while the workpiece is clamped, said cutter means being movable with reference to said bearing means in a direction which is substantially normal to the direction of travel of the workpiece.

24. An apparatus as set forth in claim 23, further comprising means for automatically returning said back support and said bearing means to the respective starting positions in response to disengagement of said coupling means and said cutter means from the workpiece.

25. An apparatus as set forth in claim 24, further comprising control means for operating said coupling means and said cutter means at identical intervals in response to travel of the workpiece through distances of predetermined length.

References Cited by the Examiner
UNITED STATES PATENTS

| | | | |
|---|---|---|---|
| 1,852,831 | 4/1932 | Young | 83—54 X |
| 2,262,619 | 11/1941 | Morris | 83—319 X |
| 2,293,260 | 8/1942 | Johnston | 83—319 X |
| 2,582,025 | 1/1952 | Frank et al. | 83—319 X |
| 3,120,142 | 2/1964 | Gruber | 83—54 X |
| 3,145,462 | 8/1964 | Bognar | 83—54 X |

WILLIAM W. DYER, JR., *Primary Examiner.*

J. M. MEISTER, *Assistant Examiner.*